United States Patent
Le Guillou et al.

(10) Patent No.: US 8,396,427 B2
(45) Date of Patent: Mar. 12, 2013

(54) SYSTEM AND METHOD FOR ADAPTIVE RADIO FREQUENCY FILTERING

(75) Inventors: Yann Le Guillou, Caen (FR); Frederic Pirot, Argences (FR); Sebastien Amiot, Bieville-Beuville (FR)

(73) Assignee: NXP B.V., Eindhoven (NL)

( * ) Notice: Subject to any disclaimer, the term of this patent is extended or adjusted under 35 U.S.C. 154(b) by 160 days.

(21) Appl. No.: 13/125,050

(22) PCT Filed: Oct. 7, 2009

(86) PCT No.: PCT/IB2009/054390
§ 371 (c)(1),
(2), (4) Date: Apr. 20, 2011

(87) PCT Pub. No.: WO2010/046798
PCT Pub. Date: Apr. 29, 2010

(65) Prior Publication Data
US 2011/0212698 A1    Sep. 1, 2011

(30) Foreign Application Priority Data
Oct. 23, 2008   (EP) .................................. 08290997

(51) Int. Cl.
*H04B 1/00*    (2006.01)
*H04B 15/00*   (2006.01)

(52) U.S. Cl. .................. 455/63.1; 455/136; 455/306

(58) Field of Classification Search ................ 455/63.1, 455/306, 296, 501, 213, 136; 370/320
See application file for complete search history.

(56) References Cited

U.S. PATENT DOCUMENTS

| | | |
|---|---|---|
| 5,325,204 A | 6/1994 | Scarpa |
| 5,400,084 A | 3/1995 | Scarpa |
| 2002/0087199 A1 | 7/2002 | Bange et al. |
| 2003/0179840 A1 | 9/2003 | Oh et al. |
| 2003/0216122 A1 | 11/2003 | Cordone et al. |
| 2004/0062216 A1* | 4/2004 | Nicholls et al. ............... 370/320 |
| 2008/0001779 A1* | 1/2008 | Cahill-O'Brien et al. ....................... 340/870.03 |

FOREIGN PATENT DOCUMENTS

| | | |
|---|---|---|
| EP | 1 760 893 A2 | 3/2007 |
| WO | 00/39936 A | 7/2000 |
| WO | 2004/109909 A1 | 12/2004 |

OTHER PUBLICATIONS

International Search Report and Written Opinion for Int'l. Patent Application No. PCT/IB2009/054390 (Feb. 12, 2010).

* cited by examiner

*Primary Examiner* — Christian Hannon
(74) *Attorney, Agent, or Firm* — Kramer & Amado P.C.

(57) ABSTRACT

A system and method provide adaptive filtering of radio frequency (RF) signals. Multiple signals are received in a predetermined RF spectrum, the signals including a desired signal and multiple potentially interfering signals. A first signal of the potentially interfering signals is down-converted to a baseband signal, and a power of the baseband signal is determined. When the power exceeds a predetermined threshold power, a first notch filter, corresponding to a frequency of the first signal, is activated.

19 Claims, 7 Drawing Sheets

SYSTEM AND METHOD FOR ADAPTIVE RADIO FREQUENCY FILTERING

FIELD OF THE INVENTION

This invention pertains to the field of data communications, and more particularly to a system and method for adaptive radio frequency (RF) filtering.

BACKGROUND AND SUMMARY OF THE INVENTION

Use of high power wireless communication standards, such as Global System for Mobile Communications (GSM), Enhanced Data Rates for GSM Evolution (EDGE), General Packet Radio Service (GPRS), Terrestrial Trunked Radio (TETRA), and Citizens Band (CB), has increased significantly. These standards may be incorporated in communication systems that are co-located with other RF systems susceptible to signal interference, such as television (TV) systems, operating in the very high frequency (VHF) and ultra high frequency (UHF) television bands. The proximity of base stations, handsets and other receivers/transmitters, particularly in densely populated urban areas, may result in television receivers being exposed to high interfering signal strengths from the co-located communications systems. For example, these interfering signal strengths may be sufficient to produce interfering signals of 100 dBµV or more at the television aerial antenna.

Accordingly, reception by broadband receivers, such as radio frequency (RF) television receivers, may be blocked during transmission of various co-located system device operating in the same bandwidths. As a result, reception quality of incoming television signals may be deemed unacceptable.

In order to prevent inference from the co-located systems, notch filters may be added to the RF side of the receiver to reject the co-located system signals.

For example, notch filters may be included in tuner 120 of television receiver 100, shown in the block diagram of FIG. 1. The television receiver also includes antenna 110, channel decoder 130 and source decoder 140 for receiving and decoding signals, which are displayed, for example, on monitor 150. The antenna 110 receives television band signals, as well as out-of-television-band signals i, i+1, i+2, . . . i+x from co-located systems. The out-of-television-band signals i, i+1, i+2, . . . i+x are within the RF spectrum and may potentially interfere with the television signals, unless properly filtered. Even though the probability of all co-located systems being active at the same time is typically low, all of the notch filters are cascaded in order to minimize the possibility of interference from one or all of the co-located systems, and thus to provide a robust solution. Consequently, the television receiver includes as many notch filters as there are co-located systems. Each notch filter introduces associated implementation loss, resulting in a corresponding loss of sensitivity for the receiver. For example, the receiver 100 would include three notch filters, respectively tuned to frequencies corresponding to signals i, i+1 and i+2. Thus, the sensitivity loss increases with the number of potentially interfering co-located systems.

In one aspect of the invention, a method is provided for adaptive filtering. The method includes receiving multiple signals in a predetermined radio frequency (RF) spectrum, the signals including a desired signal and multiple potentially interfering signals; down-converting a first signal of the potentially interfering signals to a baseband signal; and determining power of the baseband signal. It is determined whether the power exceeds a threshold power. When the power does exceed the threshold, a first notch filter corresponding to a frequency of the first signal is activated.

In another aspect of the invention, a system is provided for adaptively filtering signals in a predetermined spectrum of an RF receiver, the predetermined spectrum including a desired signal. The system includes multiple selectively activated notch filters, a power detector, a local oscillator (LO) generator, a mixer and a processor. The selectively activated notch filters are configured to filter corresponding frequencies of potentially interfering signals in the predetermined spectrum. The power detector is configured to detect an aggregate power of received signals in the predetermined spectrum and to determine whether the aggregate power exceeds a predetermined maximum power. The LO generator is configured to generate LO frequencies corresponding to the frequencies of the notch filters, the LO generator generating a first LO frequency corresponding to a first notch filter of the multiple notch filters when the aggregate power exceeds the predetermined maximum power. The mixer is configured to mix the received signals with the first LO frequency to down-convert the received signals to a baseband frequency. The processor is configured to determine whether power of the baseband signal exceeds a threshold power and, when the power exceeds the threshold power, to activate the first notch filter.

In another aspect of the invention, a system is provided for adaptively filtering signals in a predetermined spectrum of an RF receiver, the predetermined spectrum including a desired signal. The system includes multiple selectively activated notch filters, a power detector, a data path, a filter and a processor. The selectively activated notch filters are configured to filter corresponding frequencies of potentially interfering signals in the predetermined spectrum. The power detector is configured to detect an aggregate power of received signals in the predetermined spectrum and to determine whether the aggregate power exceeds a predetermined maximum power. The data path is configured to demodulate the desired signal regardless of the aggregate power. The filter adaptation path is configured to demodulate at least one of the potentially interfering signals to a baseband signal substantially simultaneously with the data path demodulating the desired signal when the aggregate power exceeds the predetermined maximum power. The processor is configured to determine whether power of the baseband signal exceeds a threshold power and, when the power exceeds the threshold power, to selectively activate a first notch filter of the notch filters corresponding to the demodulated potentially interfering signal.

DETAILED DESCRIPTION OF THE DRAWINGS

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known devices and methods may be omitted so as to not obscure the description of the example embodiments. Such methods and devices are clearly within the scope of the present teachings.

Having high powered co-located systems in proximity to broadband RF receivers may generate co-existence issues, resulting in loss of selectivity, e.g., when cascading notch filters. In the various embodiments, an adaptive filtering technique periodically monitors the relevant RF spectrum, such as the television band (e.g., 50 MHz-1.0 GHz), intelligently detects power in the co-located bands and adapts on-demand RF filtering characteristics to optimize the television receiver sensitivity. Strong unwanted signals of co-located systems may be rejected on-demand by scanning and monitoring spectral activity, for example, during a stand-by mode of the television receiver, to mitigate sensitivity degradation, which may occur due to an increased noise floor. Also, stand-by mode power dissipation may be reduced or minimized by sensing and adapting to out-of-band spectral activity, while receiving broadcast television signals. Of course, the various embodiments discussed herein may apply equally to other types of receivers, in additional to television receivers, which are subject to signal interference from co-located systems operating in the same frequency spectrum.

Figure 1:
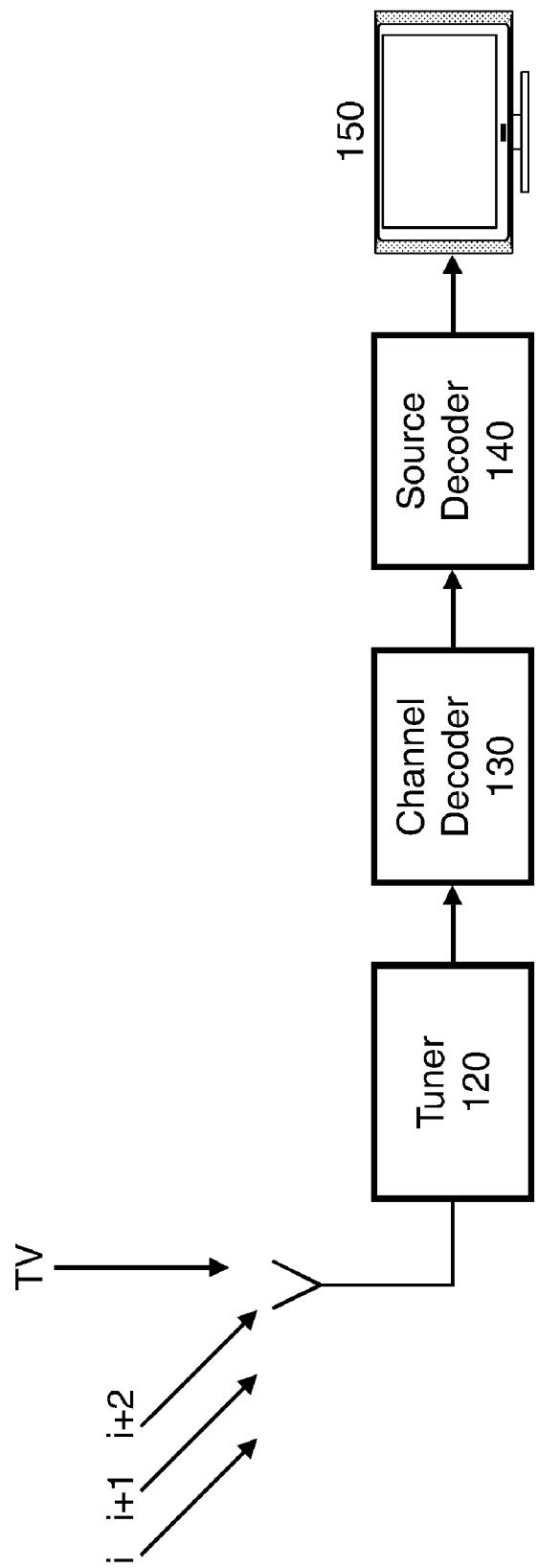
FIG. 1 is a functional block diagram of a television receiver system.
Figure 2:
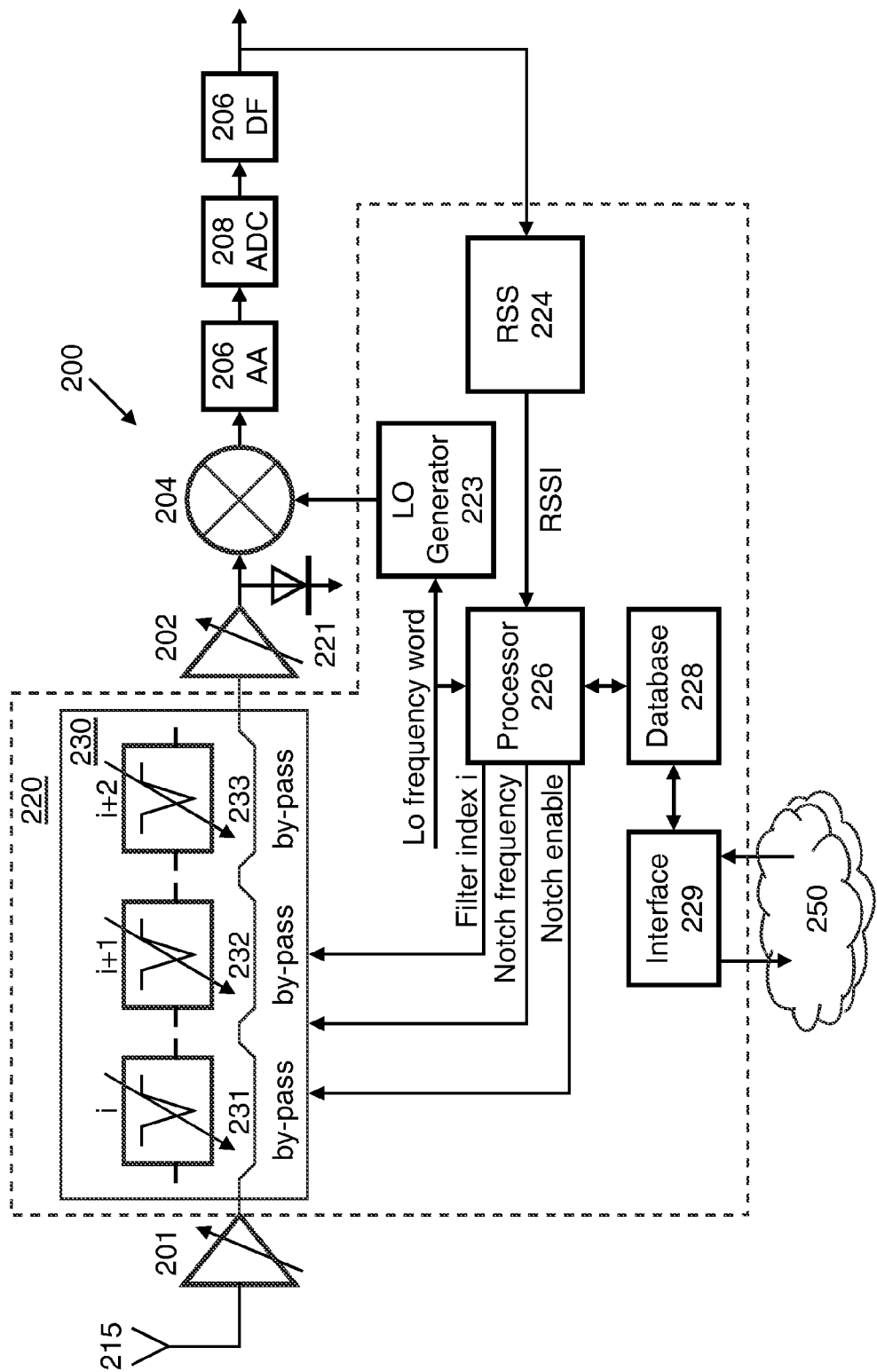
FIG. 2 is a functional block diagram of an embodiment of an adaptive RF filter.

FIG. 2 is a functional block diagram of one embodiment of an adaptive RF filter. Television receiver 200 includes adaptive filter 220, which receives broadband signals through antenna 215 and low noise amplifier (LNA) 201. The adaptive filter 220 may be included in a silicon tuner, for example. The adaptive filter 220 includes a bank of notch filters 230, depicted to include three separate notch filters 231, 232 and 233 having corresponding bypass circuits. It is understood that the notch filter bank 230 may include any number of notch filters, depending on the possible interfering signals from which the television receiver 200 is to be protected, without departing from the spirit and scope of this disclosure. The notch filters 231, 232, 233 are in a by-passed state unless activated, as discussed below. Any number and/or combination of the notch filters 231, 232, 233 may be activated at any time. Also, although a television receiver is described herein, it is understood that the adaptive filtering may be applied to other broadband receivers that susceptible to interference from signals of co-located systems.

Each notch filter 231, 232 and 233 is configured to pass all frequencies except those within a predetermined band around a center frequency to which the respective notch filter is tuned. For example, notch filter 231 may filter a frequency band centered on the frequency of GSM signals (e.g., 900 MHz) in order to filter out such signals when notch filter 231 is active (e.g., not by-passed). Other filter types that perform a similar function, such as band reject filters, may be incorporated into the notch filter bank 230. Filter characteristics may vary to provide unique benefits for any particular situation or to meet application specific design requirements of various implementations, as would be apparent to one skilled in the art.

The received (and filtered, when at least one of the notch filters 231, 232, 233 is active) signals are subjected to typical television receiver processing. For example, received RF signals may pass through a second LNA 202, and be down-converted from analog (or digitized) RF spectrum to baseband at mixer 204, by mixing the RF carrier (or intermediate) frequency with a local oscillator (LO) frequency from LO generator 223. In various embodiments, the LO generator 223 has either analog or digital means to also synthesize co-located LO frequencies. The various LO frequencies may be based on LO frequency word, for example, derived from a look-up table of LO frequencies corresponding to the RF carrier and co-located system signals. In various embodiments, the LO generator 223 may include a phase-locked loop (PLL) circuit and voltage-controlled oscillator. Also, the LO generator 223 may be controlled by the processor 226. The baseband signals pass through anti-aliasing (AA) filter 206 and analog-to-digital converter (ADC) 208, for example. The digital signals are filtered by digital filter 210 and provided to channel and source decoders (not shown).

Meanwhile, power detector 221 monitors and analyzes power activity in the relevant RF spectrum (e.g., 50 MHz to 1.0 GHz) after the LNA 202. For example, the power detector 221 may be an analog power detector, configured to monitor average power (e.g., root-mean square (RMS) power detection). An example of a power detector is disclosed in International Patent Application Pub. No. WO2004109909, published Dec. 16, 2004, entitled "Automatic Gain Control System," the contents of which are hereby incorporated by reference. In various embodiments, the power detector 221 may monitor power at the LNA 202, or alternatively, at the LNA 201. Also, LNA 202 gain may be adapted using the power detector 221.

In addition to the notch filter bank 230, the LO generator 223 and the processor 226, the adaptive filter 220 includes received signal strength (RSS) detector 224, database 228 and interface 229. In stand-by mode, the receiver 200 has the ability to wake up the devices of the adaptive filter 220. The adaptive filter 220 is activated, for example, when the RF power detected at the power detector 221 exceeds a predetermined threshold value. The threshold is based on the total aggregate power in the relevant RF spectrum. Therefore, the detected power exceeding this threshold indicates the presence of potentially interfering signals from co-located systems in the RF spectrum. The threshold for any particular television receiver 200 may vary to provide unique benefits for any particular situation or to meet application specific design requirements of various implementations, as would be apparent to one skilled in the art. For example, the threshold power varies based on the type of RF signal modulation (e.g., QPSK, 16-QAM, 64-QAM, etc.). In various embodiments, the power detector 221 may be implemented and/or controlled by the processor 226.

In FIG. 2, once the adaptive filter 220 is awakened or otherwise activated, the RSS detector 224 receives the digital signals from the digital filter 210, determines the received signal strength and provides an RSS indicator (RSSI) to the processor 226 of the adaptive filter 220. The RSS 224 receives narrowband signals, and measures RMS power, for example. More particularly, the RSS detector 224 receives one signal of the received RF spectrum, corresponding to one of the co-located systems.

The processor 226 is configured to execute one or more software algorithms, including the filter adaptation algorithm of the embodiments described herein, in conjunction with database 228 to provide the functionality of the adaptive filter 220. The processor 226 may include its own memory (e.g., nonvolatile memory) for storing executable software code that allows it to perform the various functions of the adaptive filter 220, discussed herein. Alternatively, the executable code may be stored in designated memory locations within the database 228, which may be any type of suitable electronic memory or recording medium, including random access memory (RAM), read only memory (ROM), or a combination thereof. The processor 226 is thus able to monitor the out-of-band spectral activity based on the RSSI received from the RSS detector 224. In addition, the processor 226, which receives data regarding gain stages throughout the receiver 200, is able to determine signal levels of each frequency at the antenna 215.

In particular, when the spectral activity in the co-located band is below a predetermined threshold, the processor 226 controls the notch filter bank 230, such that all of the notch filters 231, 232 and 233 are by-passed. However, when the spectral activity exceeds the predetermined threshold, the processor executes an adaptive filter algorithm, discussed below with reference to FIG. 5, to determine which, if any, notch filters 231, 232 and 233 are to be activated. For example, the processor 226 may send a notch enable signal directed to the notch filter in notch filter bank 230 corresponding to notch index i and/or a particular notch frequency. In an embodiment, various statistics, e.g., stored in database 228, may also be factored into the determination of notch filter activation. The statistics may include field statistics, for example, provided by a network operator or broadcaster over network 250, which may be a packet switching network or other data network. The processor 226 and/or database 228 receive the statistics via the interface 229. Accordingly, frequency bands from multiple co-located systems can be successively monitored, and based on RSSI and statistics, notches can be selectively cascaded to filter only the interfering co-located systems.

At the end of the scanning procedure, the receiver 200 is aware of the out-of-television-band spectrum activity and has adapted RF filtering to the field condition, without excessive filtering. The adaptive RF filtering is susceptible to change at any spectrum scanning since the field conditions are susceptible to change. Also, statistical results of the scanning stored in database 228 can be exploited by the network operator and/or broadcaster. In addition, repair and maintenance personnel may access the database 228 in order to analyze the functionally and operating environment of the receiver 200.

Figure 3:
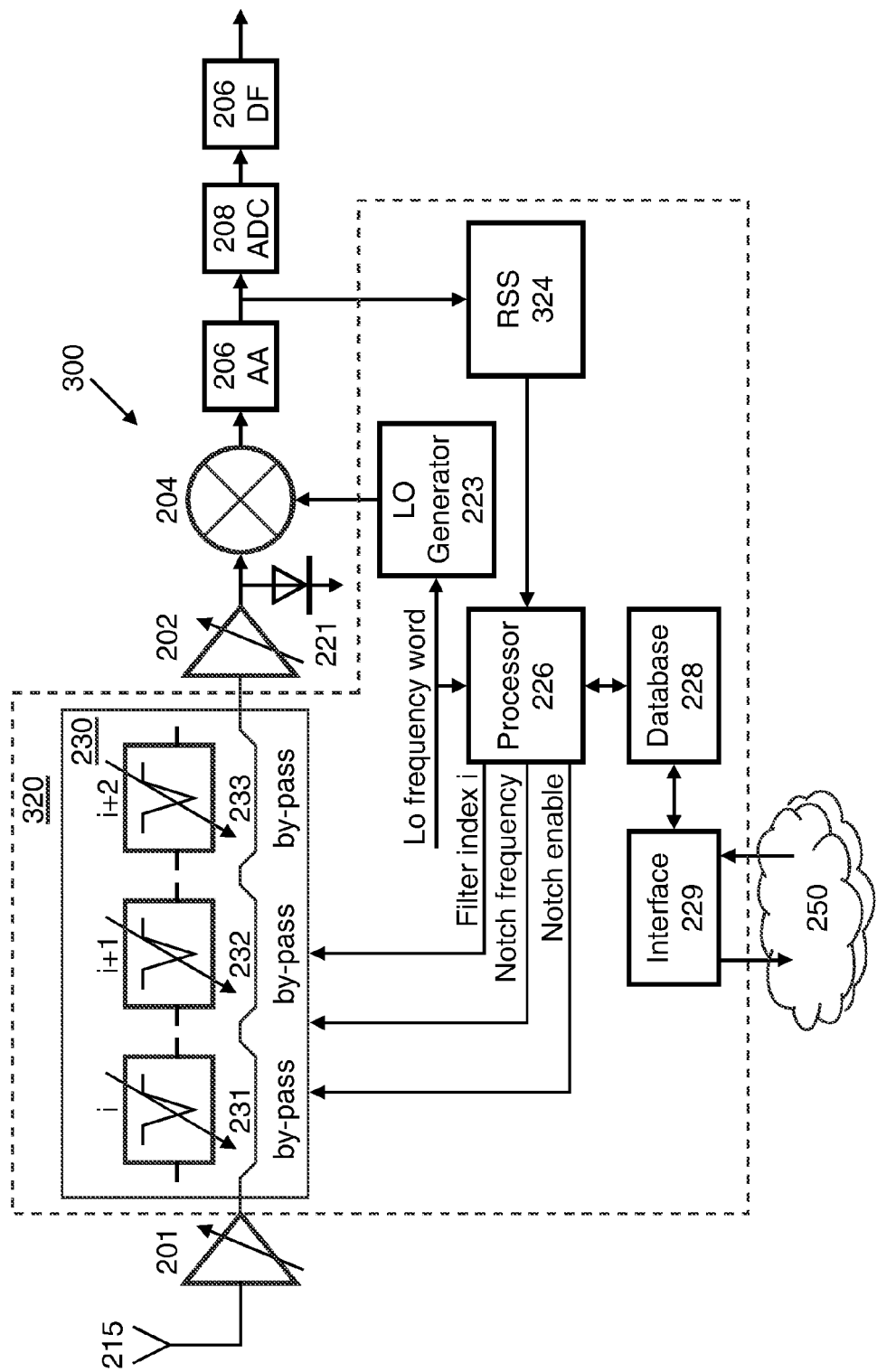
FIG. 3 is a functional block diagram of another embodiment of an adaptive RF filter.

FIG. 3 is a functional block diagram of another embodiment of an adaptive RF filter. Television receiver 200 includes adaptive filter 220, which is configured substantially the same as discussed above with respect to FIG. 2. However, in FIG. 3, the power spectrum activity is measured using or an analog RSSI function, as indicated by the RSS detector 224 receiving signals prior to ADC 208. Notably, though, the digital RSSI configuration of FIG. 2 tends to be more accurate and somewhat easier to implement. Further, digital information coming from the RSSI is easily interpreted by a digital statistic analysis function.

Figure 4:
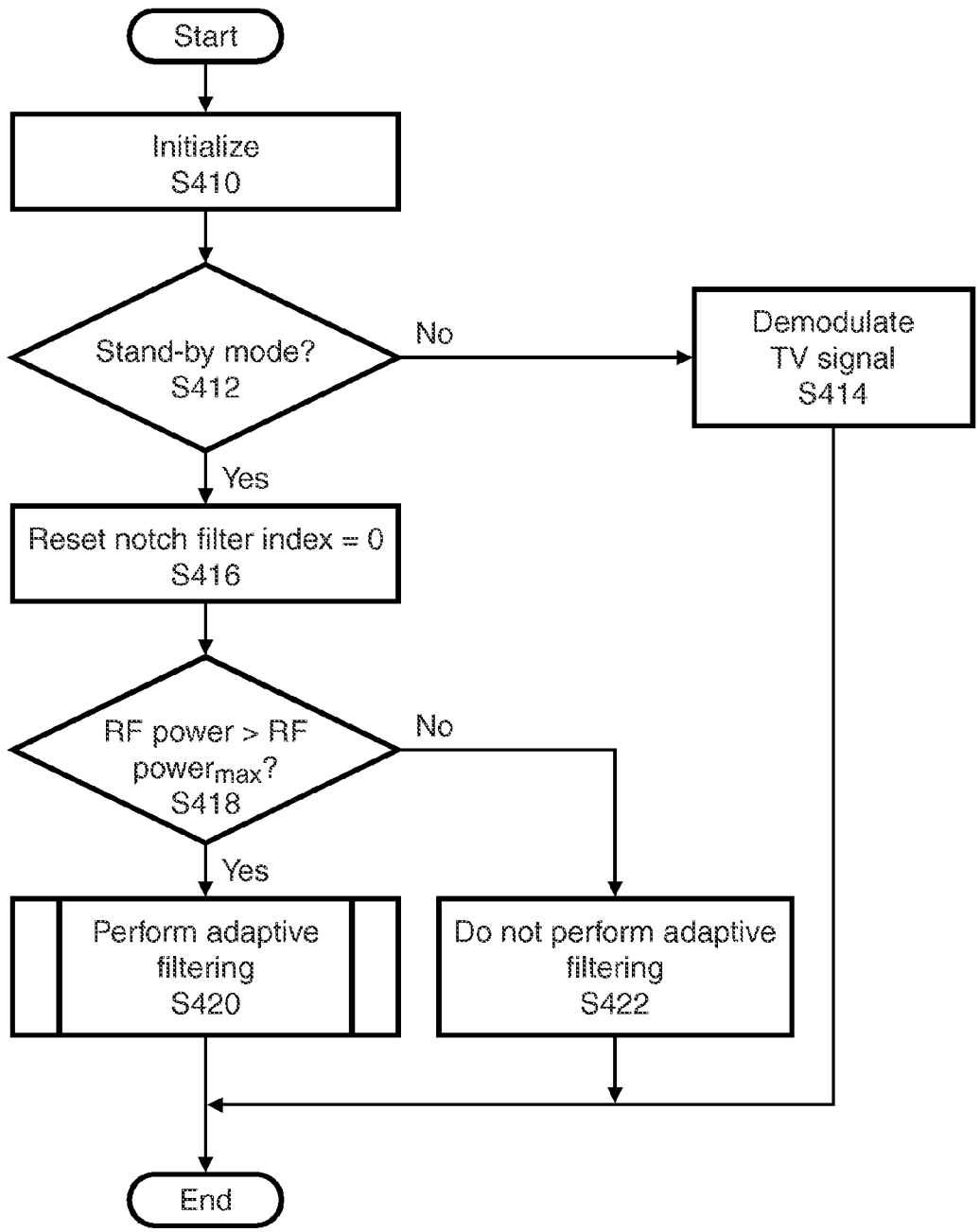
FIG. 4 is a flow diagram of an embodiment of a method for adaptive filtering of RF signals.

FIG. 4 is a flow diagram of an embodiment of a method for adaptive filtering of RF signals, with reference to FIG. 2, in which field activity is scanned and monitored while the receiver 200 is in the stand-by mode. The depicted process may be executed, for example, by the processor 226 of the adaptive filter 220, or a combination of the processor 226 and a separate processor(s) (not shown) controlling signal reception and processing functions of the receiver 200. Of course, in an embodiment, the processor 226 may be commonly used for all functions of the receiver 200.

At step S410, the adaptive filtering algorithm is initialized. For example, an $RFpower_{max}$ word is set to provide a threshold for the received power to trigger adaptive filtering. $RFpower_{max}$ is based on the total aggregate power in the relevant RF spectrum (e.g., 50 MHz to 1.0 GHz), such that exceeding this threshold indicates the presence of potentially interfering signals from co-located systems in the RF spectrum. The maximum power may be determined, for example, based on receiver design. Likewise, an $RSSI_{max}$ word is set to provide a threshold for received signal strength to determine when specific notch frequencies are to be filtered.

In addition, a statistics bit may be set to indicate whether statistics, e.g., from the database 228, will factor into the adaptive filtering determination. For example, the statistics bit may be set to "1" to enable use of statistics and "0" to disable the use of statistics. In an embodiment, statistical data may be collected and stored, e.g., in the database 228, even when the statistic bit is set to "0," indicating that statistical data will not be relied on for the actual adaptive filtering determination. In addition, various counters may be set to limit the time or repetition of the adaptive filter algorithm. For instance, an $RSSIcounter_{max}$ word may be set to limit the number of power measurements at a particular frequency and maximum time index word $k_{max}$ may be set to limit the overall time the adaptive filter algorithm is performed.

At step S412, it is determined whether the television receiver 200 is in stand-by mode, which may occur when no signal is received and/or processed in the television band. When the receiver 200 is not in stand-by mode (S412: No), meaning that it is actively receiving and processing television signals, the television signals are demodulated at step S414. When the receiver 200 is in stand-by mode (S412: Yes), a notch filter index is reset to zero (i.e., i=0) at step S416, which causes all notch filters (e.g., 231-233) to be by-passed.

At step S418, it is determined whether the received RF power is greater than $RFpower_{max}$. The received RF power is measured, for example, at the power detector 221 and compared to $RFpower_{max}$ by the processor 226. When the received power is not greater than $RFpower_{max}$ (S418: No), adaptive filtering is not performed, as indicated by step S422. However, when the received power is greater than $RFpower_{max}$ (S418: Yes), the adaptive filtering process, as indicated by S420, is performed. The adaptive filtering process is shown in detail in FIG. 5, discussed below.

Figure 5:
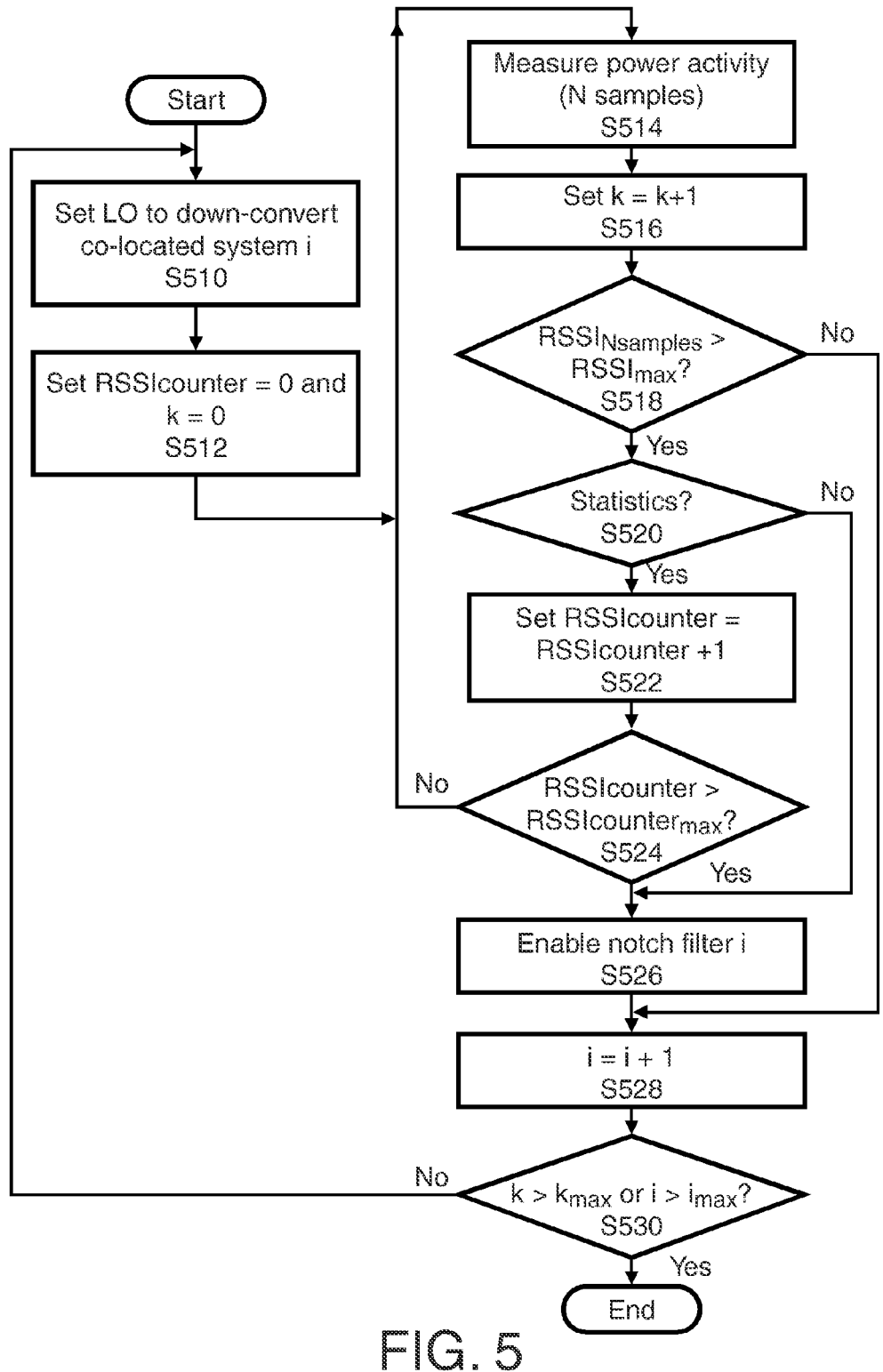
FIG. 5 is a flow diagram of an embodiment of a method for adaptive filtering of RF signals.

FIG. 5 is a flow diagram of an embodiment of a method for adaptive filtering of RF signals. Again, referring to the illustrative configuration of FIG. 2 for purposes of discussion, the depicted process may be executed, for example, by the processor 226 of the adaptive filter 220, or a combination of the processor 226 and separate processor(s) (not shown) controlling signal reception and processing functions of the receiver 200. Of course, in an embodiment, the processor 226 may be commonly used for all functions of the receiver 200.

At step S510, the local oscillator (LO) generator 223 is set to a predetermined LO frequency, which is provided to the mixer 204 in order to down-convert signals from one of the co-located systems, which may potentially interfere with television reception. In particular, step S510 shows setting the LO frequency to enable down-conversion of signals from co-located system i, which may be initially set to "1," for example. As discussed above, FIG. 2 shows three notch filters 231-233, which correspond to frequencies from three co-located systems, although it is understood that more or fewer co-located systems (for which the adaptive filter 220 would have corresponding notch filters) may be addressed. The LO frequency output by the LO generator 223 is based on LO frequency word, which may be provided, for example, by processor 226, database 228, look-up table (not shown), or the like. In addition, at step S512, RSSIcounter and timing index k are initialed, for example, by being set to zero (i.e., RSSIcounter=0 and k=0).

As step S514, the power activity at the down-converted baseband frequency is measured for N samples, and corresponding RSSI is computed. For example, by obtaining multiple samples, RMS power at the potentially interfering frequency may be determined, although other techniques for measuring power at various frequencies may be incorporated. The timing index is then incremented (k=k+1) at step S516.

The RSSI of the N samples ($RSSI_{Nsamples}$) is compared to the predetermined value of $RSSI_{max}$ at step S518, in order to determine whether the power from the subject co-located system (i=1) is sufficient to cause interference with the television signals. When $RSSI_{Nsamples}$ is not greater than $RSSI_{max}$ (S518: No), it does not pose an interference problem for the television receiver 200, and thus the corresponding notch filter (notch filter i=1) is not activated. The process proceeds to step S528, where i is incremented by 1 (i=i+1) in order to analyze the co-located system corresponding to the next notch filter. However, when $RSSI_{Nsamples}$ is greater process 30 than $RSSI_{max}$ (S518: Yes), interference may likely exist, and the proceeds to step S520.

At step S520, it is determined whether statistical data will be factored into the determination of when the corresponding notch filter (notch filter i=1) will be activated. This determination may be based on whether the statistics bit is set to "1," as discussed above with respect to initialization at step S410 of FIG. 4. For example, historical data may be collected during operation of the receiver 200 and/or the adaptive filter 220 over a period of time, and the data may be accessed to determine when to activate a particular notch filter. For example, data indicating the number of times that $RSSI_{Nsamples}$ exceeds $RSSI_{max}$ may be collected and stored in the database 228. Then, the number of times $RSSI_{Nsamples}$ exceeds $RSSI_{max}$ within a predetermined time period (e.g., per hour or per day) may be factored into the determination of when to activate the filter.

For portable televisions, historical data may be coupled with localization data (e.g., from a Global Positioning System (GPS) or ad-hoc network) to also enable filters to be activated/deactivated taking into account both overload statistics and localization inputs. As a result, in a home environment, for example, some notch filters could be activated in a living room for instance, and not in a bedroom, due to respective proximities of high power co-located systems, such as a cellular handset.

In alternative embodiments, any historical data may be used to selectively activate the notch filter(s). For example, the statistical data may indicate over time that interference from co-located system i occurs every day between 1:00 p.m. and 3:00 p.m. Accordingly, based on the statistical data, the processor 226 may be trained to activate the corresponding notch filter i during this time period, with or without $RSSI_{Nsamples}$ being greater than $RSSI_{max}$. Also, the historical data may indicate information regarding other systems, such as parameters and/or operating conditions of neighboring television receivers. Further, in alternative embodiments, the statistical data may be used to adjust parameters of the receiver 200, other than notch filter activation/deactivation. For example, repair or maintenance personnel may access the statistical data in database 228, and determine that altering polarization of antenna 215 may reduce interference from one or more of the co-located systems.

When statistics are not factored in (S520: No), the corresponding notch filter is activated at step S526 and i is incremented by 1 (i=i+1), in order to analyze the co-located system corresponding to the next notch filter, at step S528.

When statistical data are to be factored in (S520: Yes), RSSIcounter is incremented (RSSIcounter=RSSIcounter+1) at step S522. RSSIcounter indicates the number of times that $RSSI_{Nsamples}$ has exceeded the $RSSI_{max}$ at the particular frequency, which information may by stored in the database 228. At step S524, the new value of RSSIcounter is compared to the previously set $RSSIcounter_{max}$, which indicates the threshold number of times the receiver 200 will tolerate excessive power at the particular frequency. When RSSIcounter is greater than $RSSIcounter_{max}$ (S524: Yes), the corresponding notch filter is activated at step S526 and i is incremented by 1 (i=i+1), in order to analyze the co-located system corresponding to the next notch filter, at step S528.

However, when RSSIcounter is not greater than $RSSIcounter_{max}$ (S524: No), the process returns to step S514, where the power activity is measured from another N samples. This reduces the chances, for example, of prematurely activating the corresponding notch filter based on a single excessive power measurement. In other words, the process indicated by steps S514 through S524 is repeated until either the $RSSI_{Nsamples}$ is less than $RSSI_{max}$ (step S518: No), or the threshold number of excessive power measurements is greater than $RSSIcounter_{max}$ (step S524: Yes), at which point the corresponding notch filter is activated at step S526 and i is incremented by 1 (i=i+1) at step S528.

After step S528, when the analysis of co-located system i has been completed, it is determined whether the timing index k has lapsed ($k>k_{max}$) or whether there are no remaining co-located systems and corresponding notch filters i ($i>i_{max}$) at step S530. when either of these conditions is met (S530: Yes), the adaptive filtering process ends. However, when both the timing index k is less than or equal to $k_{max}$ and the filter index i is less than or equal to $i_{max}$, the process returns to step S510, so that an adaptive filtering determination may be made with respect to the next co-located system. For instance, at step S510, the LO frequency of LO generator 223 is set to down-convert signals of the co-located system i to baseband, which is the next consecutive co-located system (and corresponding notch filter) 2, since i was incremented by 1 at step S528. RSSIcounter and timing index k are each set to 0 at step S512. Steps S514 through S524 are then repeated for determining whether the corresponding notch filter i should be activated for the new frequency, based on the measured power activity, the RSSI threshold and/or statistics. As stated above, the process is repeated until it is determined at step S530 that the time index has been exceeded ($k>k_{max}$) or there are no other co-located systems/notch filters ($i>i_{max}$).

According the illustrative method depicted in FIGS. 4 and 5, received interference from neighboring high powered co-located systems is notched on-demand, while de-sensing of the television receiver 200 (e.g., due to excessive unnecessary notch filtering) is minimized.

In addition, field statistics at the receiver antenna 215 can be further exploited, for example, by network operators and/or television broadcasters uploading or downloading the memory contents from or to the database 228 via the network 250. When uploading memory contents, the network operators, broadcasters, etc., are able to receive statistical data about field conditions at the television antenna 215. This statistical data may be used to adjust aspects of the network or broadcasting system. For example, statistical data from several receivers may be compared to identify and monitor trends over a geographical area. When downloading memory contents, e.g., with field statistics from third parties (broadcaster, network operators, repair and maintenance personnel, etc.), the adaptive filter 220 can be forced to a given configuration by controlling the statistical data. Downloading the memory content may also be of interest to help repair and maintenance personnel to diagnosis failures and ultimately to properly adjust, for example, interface between antenna and tuner input. The memory content can also be used to adapt other system components, such as gain, polarity and/or selectivity of the antenna 215.

The embodiments depicted in FIGS. 2 and 3 may cause an increase in stand-by current since LNAs 201 and 202 must always be enabled, such that the power detector 221 enables the field sensing to determine spectrum activity and then adapt on-demand the notch filtering. In contrast, the embodiments discussed below with respect to FIGS. 6 and 7 provide effective adaptive filtering, without causing increased stand-by current.

Figure 6:
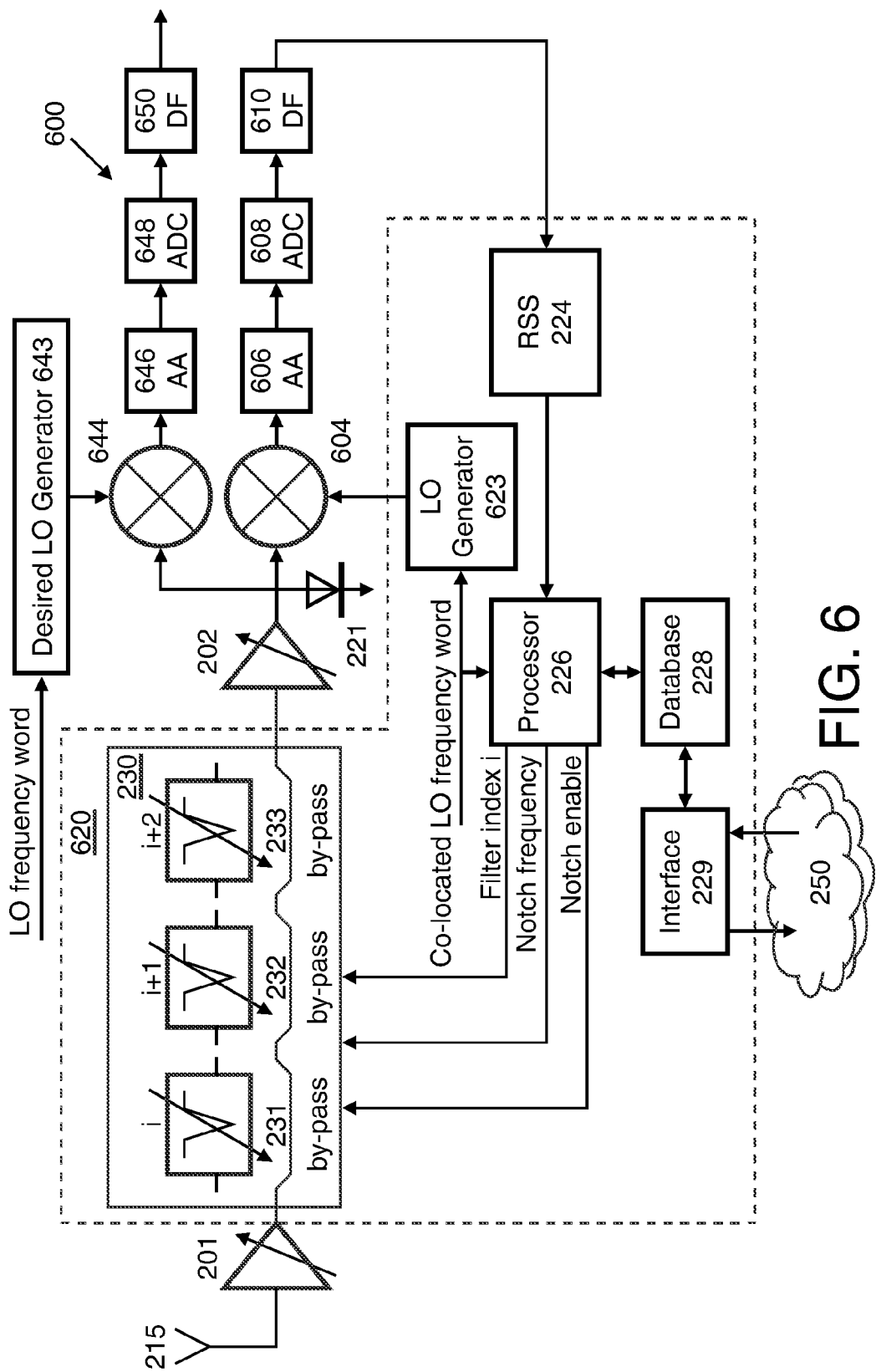
FIG. 6 is a functional block diagram of another embodiment of an adaptive RF filter.
Figure 7:
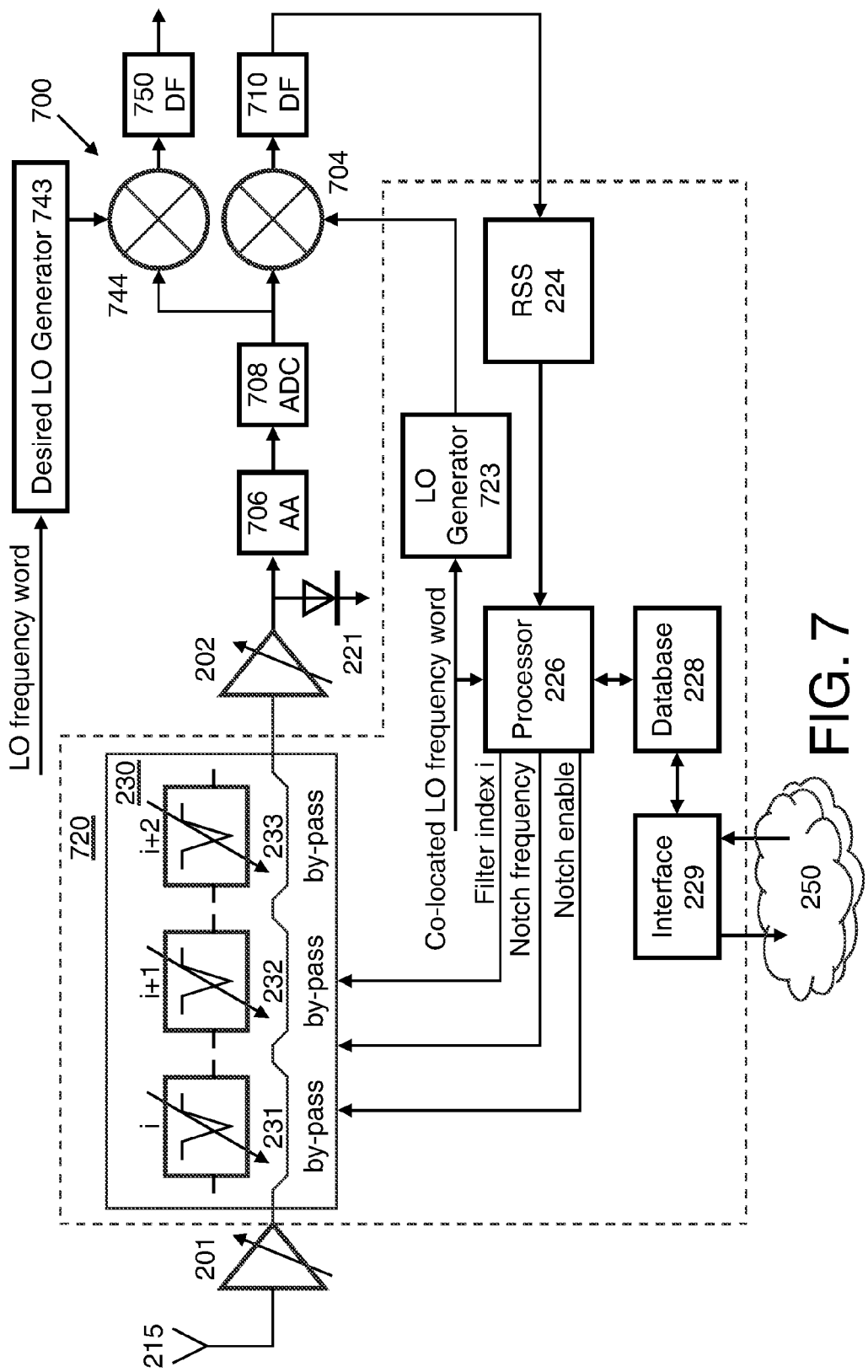
FIG. 7 is a functional block diagram of another embodiment of an adaptive RF filter.

More particularly, FIG. 6 is a functional block diagram of another embodiment of an adaptive RF filter. Television receiver 600, which includes adaptive filter 620, has the ability to simultaneously demodulate television signals and scan out-of-television-band spectrum activity to adapt. The adaptive filter 620 is thus able to adapt, on demand, the notch filtering functionality of the notch filters 231-233 without having to wait for the television receiver 600 to be in stand-by mode. Further, the relevant statistics around field conditions may still be collected and accessed by third parties, as discussed above.

Referring to FIG. 6, the television receiver 600 includes a parallel data path that operates to receive and demodulate the television signals using the television signal LO frequency, generated by LO generator 643 based on LO frequency word, at the same time signals from co-located signals are received and demodulated using the co-located LO frequencies, generated by LO generator 623 based on co-located LO frequency word. In addition to the LO generator 643, the data path includes mixer 644 for mixing the received RF carrier with the LO frequency, AA 646 for filtering the baseband signals, ADC 648 for converting the filtered analog signals to digital signals, and digital filter 650 for filtering the digital signals, which are provided to channel and source decoders (not shown).

Meanwhile, digital signals for adaptive filtering are provided to RSS 224 of the adaptive filter 620 through mixer 604, AA 606, ADC 608 and digital filter 610, in substantially the same manner as discussed above with respect to FIG. 2, for example. In an alternative embodiment, the RSS 224 may receive analog signals, as discussed above with respect to FIG. 3. According to the configuration depicted in FIG. 6, there is no need for first determining whether the television receiver 600 is in stand-by mode (e.g., as in step S412 of FIG. 4). Rather, the LO generator 643 and mixer 644 are able to continuously down-convert the television signals based on the television frequency, while the LO generator 623 and mixer 604 are able to down-convert potentially interfering signals based on the frequencies of the co-located signals. Once the filtered digital signal is received by the RSS 224 of the adaptive filter 620, the adaptive filtering algorithm may be executed in substantially the same manner as discussed above with respect to FIG. 5.

FIG. 7 is a functional block diagram of another embodiment of an adaptive RF filter. Television receiver 700 has a direct-sampling multi-channel tuner, including adaptive filter 720, which similarly has the ability to simultaneously demodulate television signals and scan out-of-television-band spectrum activity, as discussed above with respect to FIG. 6. The adaptive filter 720 is thus able to adapt, on demand, the notch filtering functionality of the notch filters 231-233 without having to wait for the television receiver 700 to be in the stand-by mode.

Referring to FIG. 7, the television receiver 700 includes a parallel data path that operates to receive and demodulate the television signals based on the television signal LO frequency, generated by LO generator 743, at the same time signals from co-located signals are received and demodulated based on the co-located LO frequencies, generated by LO generator 723 of the adaptive filter 720. In addition to the LO generator 743, the data path of receiver 700 includes complex multiplier 744 and digital filter 750.

Unlike the receiver 600 shown in FIG. 6, the receiver 700 performs anti-alias filtering at AA 706 and converts the filtered analog signal to a digital signal at ADC 708 prior to down-converting the received signal to baseband. Therefore, the full RF signal spectrum (e.g., 50 MHz to 1.0 GHz) applied at the input is digitized in its entirety, and channel selection and frequency conversion, performed by complex multipliers 704 and 744, is done in the digital domain. Accordingly, multiple channels can be received concurrently, enabling out-of-television-band spectrum activity to be monitored, while television signals are demodulated in the digital domain.

For example, the LO generator 743 provides an LO frequency to the complex multiplier 744 to down-convert received television signals in the digital domain, while the LO generator 723 provides an LO frequency to the complex multiplier 704 to down-convert received potentially interfering signals from co-located systems in the digital domain. Digital filters 710 and 750 filter the digital television and co-located systems signals, respectively. The filtered television signals are provided to channel and source decoders (not shown), and the filtered co-located system signals for adaptive filtering are provided to co-located RSS 224 of the adaptive filter 720 (note that there may also be a RSS for the desired TV signal). According to the configuration depicted in FIG. 7, there is no need for first determining whether the television receiver 700 is in stand-by mode (e.g., as in step S412 of FIG. 4). Rather, the LO generator 743 and complex multiplier 744 are able to continuously down-convert the television signals based on the television frequency, while the LO generator 723 and complex multiplier 704 are able to scan (down-convert and analyze the co-located RSS) all the potentially interfering signals. Once the filtered digital signal is received by the RSS 224 of the adaptive filter 720, the adaptive filtering algorithm may be executed in substantially the same manner as discussed above with respect to FIG. 5.

While representative embodiments are specifically disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. An adaptive filtering method, comprising:
receiving a plurality of signals in a predetermined radio frequency (RF) spectrum, wherein the plurality of signals comprise a desired signal and a plurality of potentially interfering signals;
down-converting a first signal of the plurality of potentially interfering signals to a baseband signal;
determining a power of the baseband signal;
comparing the power to a threshold power;
receiving statistical data, on an interface, via a data network; and when the power exceeds the threshold power, selectively activating a first notch filter corresponding to a frequency of the first signal based upon the received statistical data.

2. The method of claim 1, further comprising:
initially determining whether a total received power of the RF spectrum exceeds a total power threshold, wherein the total received power indicates a presence of at least one signal of the plurality of potentially interfering signals; and
down-converting the first signal to the baseband signal only when the total received power exceeds the total power threshold.

3. The method of claim 2, further comprising:
when the power does not exceed the threshold power, not activating the first notch filter.

4. The method of claim 1, wherein determining the power of the baseband signal comprises:
measuring power activity of a plurality of samples of the baseband signal; and
determining a root-mean square power of the baseband signal based on the measured power activity of the plurality of samples.

5. The method of claim 1, wherein down-converting the first signal further comprises:
selectively setting a local oscillator signal; and
mixing the local oscillator signal with the received plurality of signals to down-convert the first signal.

6. The method of claim 1, further comprising:
down-converting a second signal of the plurality of potentially interfering signals to the baseband signal;
determining the power of the baseband signal; and
comparing the power to the threshold power; and
when the power exceeds the threshold power, activating a second notch filter corresponding to a frequency of the second signal.

7. The method of claim 1, further comprising:
when the power exceeds the threshold power, accessing the received statistical data before activating the first notch filter, the received statistical data comprising an aggregate number of times the power has exceeded the threshold power;
incrementing the aggregate number of times by one; and
determining whether the incremented aggregate number of times exceeds a predetermined maximum number of times.

8. The method of claim 7, further comprising:
activating the first notch filter only when the incremented aggregate number of times exceeds the maximum number of times.

9. The method of claim 8, further comprising:
when the incremented aggregate number of times does not exceed the maximum number of times, determining again the power of the baseband signal; and
comparing the redetermined power to the threshold power.

10. An adaptive filtering method, comprising:
receiving a plurality of signals in a predetermined radio frequency (RF) spectrum, wherein the plurality of signals comprise a desired signal and a plurality of potentially interfering signals;
down-converting a first signal of the plurality of potentially interfering signals to a baseband signal;
determining a power of the baseband signal;
comparing the power to a threshold power; and
when the power exceeds the threshold power, activating a first notch filter corresponding to a frequency of the first signal, wherein the desired signal comprises a television signal, and the plurality of potentially interfering signals comprise a plurality of signals generated by co-located systems.

11. The method of claim 10, further comprising:
initially determining whether a television receiver configured to receive the television signal is in a stand-by mode; and
down-converting the first signal of the plurality of potentially interfering signals to a baseband signal only when the television receiver is in the stand-by mode.

12. The method of claim 10, further comprising:
down-converting the television signal to a television baseband signal substantially simultaneously with down-converting the first signal of the plurality of potentially interfering signals to the baseband signal.

13. A system for adaptively filtering signals in a predetermined spectrum of a radio frequency (RF) receiver, wherein the predetermined spectrum includes a desired signal, the system comprising:
a plurality of selectively activated notch filters configured to filter a corresponding plurality of frequencies of potentially interfering signals in the predetermined spectrum;
a power detector configured to detect an aggregate power of received signals in the predetermined spectrum and to determine whether the aggregate power exceeds a predetermined maximum power;
a local oscillator (LO) generator configured to generate a plurality of LO frequencies corresponding to the plurality of frequencies of the selectively activated notch filters, the LO generator generating a first LO frequency corresponding to a first notch filter of the plurality of selectively activated notch filters when the aggregate power exceeds the predetermined maximum power;
a mixer configured to mix the received signals with the first LO frequency to down-convert the received signals to a baseband frequency;
a processor configured to determine whether a power of the baseband signal exceeds a threshold power and, when the power exceeds the threshold power, to activate the first notch filter; and
an interface configured to receive statistical data via a data network.

14. The system of claim 13, further comprising:
a received signal strength determiner configured to measure the power of the baseband signal.

15. The system of claim 14, wherein, after the processor determines whether the measured power exceeds the threshold power, the LO generator generates a second LO frequency corresponding to a second notch filter of the plurality of notch filters when the aggregate power exceeds the predetermined maximum power, the mixer mixes the received signals with the second LO frequency to down-convert the received signals to the baseband frequency, the received signal strength determiner measures power of the baseband signal, and the processor determines whether the measured power exceeds the threshold power, and, when the power exceeds the threshold power, activates the second notch filter.

16. The system of claim 13, wherein the processor activates the first notch filter based on the statistical data received through the interface.

17. A system for adaptively filtering signals in a predetermined spectrum of a radio frequency (RF) receiver, wherein the predetermined spectrum comprises a desired signal, the system comprising:

a plurality of selectively activated notch filters configured to filter a corresponding plurality of frequencies of potentially interfering signals in the predetermined spectrum;

a power detector configured to detect an aggregate power of received signals in the predetermined spectrum and to determine whether the aggregate power exceeds a predetermined maximum power;

a data path configured to demodulate the desired signal regardless of the aggregate power;

a filter adaptation path configured to demodulate at least one of the plurality of potentially interfering signals to a baseband signal substantially simultaneously with the data path demodulating the desired signal when the aggregate power exceeds the predetermined maximum power;

a processor configured to determine whether a power of the baseband signal exceeds a threshold power and, when the power of the baseband signal exceeds the threshold power, to selectively activate a first notch filter of the plurality of notch filters corresponding to the potentially interfering signal; and an interface configured to receive statistical data via a data network.

18. The system of claim 17, wherein the data path comprises:

a first local oscillator (LO) generator configured to generate a desired LO frequency corresponding to a frequency of the desired signal, and a first mixer configured to mix the received signals with the desired LO frequency to down-convert the received signals for processing the desired signal; and wherein the filter adaptation path comprises:

a second LO generator configured to generate a plurality of LO frequencies corresponding to the plurality of frequencies of the notch filters, the second LO generator generating a first LO frequency corresponding to the first notch filter, and a second mixer configured to mix the received signals with the first LO frequency to down-convert the received signals to the baseband frequency.

19. The system of claim 17, wherein the data path comprises:

a first local oscillator (LO) generator configured to generate a desired LO frequency corresponding to a frequency of the desired signal, and a first complex multiplier configured to down-convert the received signals for processing the desired signal, after the received signals have been converted from analog signals to digital signals; and wherein the filter adaptation path comprises a second LO generator configured to generate a plurality of LO frequencies corresponding to the plurality of frequencies of the notch filters, the second LO generator generating a first LO frequency corresponding to the first notch filter, and a second complex multiplier configured to down-convert the received signals to the baseband frequency after the received signals have been converted from analog signals to digital signals.

* * * * *